US00RE38517E

(19) United States
(12) Reissued Patent
Pfeiffer et al.

(10) Patent Number: US RE38,517 E
(45) Date of Reissued Patent: May 18, 2004

(54) UNIVERSAL FLOW TRACK SYSTEM

(75) Inventors: Harold Pfeiffer, Forked River, NJ (US); Frank J. Neuwirth, Wall, NJ (US)

(73) Assignee: Unex Conveying Systems Inc., Jackson, NJ (US)

(21) Appl. No.: 10/021,781

(22) Filed: Oct. 30, 2001

Related U.S. Patent Documents

Reissue of:
(64) Patent No.: 6,132,158
Issued: Oct. 17, 2000
Appl. No.: 09/007,031
Filed: Jan. 14, 1998

(51) Int. Cl.[7] ..... B65G 13/00
(52) U.S. Cl. ..... 414/276; 193/35 R; 193/37; 211/151; 211/175; 211/187; 211/189; 414/529
(58) Field of Search ..... 414/529, 276, 414/537, 538, 532; 193/35 R, 37, 35 J, 38; 211/151, 59.2, 189, 175, 187

(56) References Cited

U.S. PATENT DOCUMENTS

| | | | | | |
|---|---|---|---|---|---|
| 3,869,031 | A | * | 3/1975 | Coleman et al. | 193/35 R |
| 3,900,112 | A | * | 8/1975 | Azzi et al. | 211/59.2 X |
| 4,790,707 | A | * | 12/1988 | Magretta et al. | 414/276 |
| 5,115,920 | A | * | 5/1992 | Tipton et al. | 211/59.2 |
| 5,160,051 | A | * | 11/1992 | Bustos | 211/59.2 |
| 5,474,412 | A | * | 12/1995 | Pfeiffer et al. | |
| 6,132,158 | A | * | 10/2000 | Pfeiffer et al. | 414/276 |
| 6,510,935 | B1 | * | 1/2003 | McIlvaine | 193/35 R |

FOREIGN PATENT DOCUMENTS

| | | | | | |
|---|---|---|---|---|---|
| DE | 3731404 | | * | 4/1989 | 193/35 R |
| DE | 3733170 | | * | 4/1989 | 193/35 R |
| DE | 003837035 | A1 | * | 5/1990 | 193/35 R |
| EP | 576693 | | * | 1/1994 | 414/276 |
| FR | 2699897 | | * | 7/1994 | 414/276 |
| JP | 361291307 | A | * | 12/1986 | 414/276 |
| NO | 93821 | | * | 4/1959 | 193/35 R |

* cited by examiner

*Primary Examiner*—James W. Keenan
(74) *Attorney, Agent, or Firm*—Salzman & Levy

(57) ABSTRACT

The present invention features a universal, low profile, expandable flow track system that can be drop-load mounted to almost any supporting frame or pallet rack. The flow track system of the invention features a flow track that mounts flush with its end supports, and is infinitely adjustable along both the horizontal axis and depth axis of the storage frame. The flow track is quickly assembled to, adjusted upon, and removed from, the storage frame.

2 Claims, 12 Drawing Sheets

14
11
12
20
20'
43
45
50
52

UNIVERSAL FLOW TRACK SYSTEM

Matter enclosed in heavy brackets [ ] appears in the original patent but forms no part of this reissue specification; matter printed in italics indicates the additions made by reissue.

RELATED PATENTS

This application is related to U.S. Pat. No. 5,474,412, issued Dec. 12, 1995, for FLOW RACK SYSTEM.

FIELD OF THE INVENTION

The present invention pertains to material storage tracks and, more particularly, to an improved, extendable flow track storage system that is universally adaptable to, and infinitely adjustable about, most skeletal storage frames, with the aid of universal retaining elements.

BACKGROUND OF THE INVENTION

The above-identified U.S. Pat. No. 5,474,412 relates to a new flow track storage apparatus that is adjustable in all three orthogonal planes. The flow track component of the apparatus was designed to seat within a toothed retainer bar that mechanically mounts to the horizontal end supports of a warehouse pallet rack. The flow track is horizontally adjustable along the entire retainer bar and, hence, along the entire horizontal dimension of the pallet rack. This is accomplished by seating the flow track within particular retainer bar slots. The flow track is most welcome for its capability of supporting heavy loads of up to 50 pounds per foot.

The aforementioned flow track is vastly superior to conventional, flimsy, poorly supportive rails containing a series of plastic wheels or rollers. These prior art, commonly used rails could never properly support heavy loads, even with heavy, mid-support bracing. The rails were never practical, despite their low cost, which was essentially their only appeal. Lifetime guarantees are commercially offered as an incentive to overlook the inability of the conventional rail system to provide good operability. Therefore, the economy that is originally perceived with this system is, in actuality, deceptive. Their frequent replacement more than counterbalances any initial savings.

The above-mentioned flow track system, on the other hand, was well received by the industry, but four major disadvantages remained: (1) it required horizontal toothed retainer bars; (2) the retainer bars required mechanical attachment to the frame, which was both laboriously expensive and time consuming; (3) the flow track system had no facility to extend itself in depth beyond a single frame support; and (4) the flow tracks had a high profile. In fact, they stood several inches above the support beam when they were mounted upon the tier. This seriously reduced the tier density and the vertical storage space.

In addition, the horizontal support bars were several inches thick. Top surface mounting of track members on top of support beams meant that several additional inches of vertical space in each tier were wasted. Averaged over many tiers of storage throughout the facility, this high profile method of support wasted space and resulted in a sizable loss of storage capacity. Considering that the object of any storage scheme is to provide high-density storage within a facility, it was obvious that the flow track of the aforementioned patent was not a complete solution to efficiently storing materials in maximum storage facilities.

The present invention incorporates an improved flow track system, wherein the flow track component can now be mounted flush with the horizontal support bars via the use of a universal, drop-in retaining element. The universal retaining element allows the track to be drop-loaded upon the beam supports of the frame without tooling or mechanical attachment. Most important, however, is the fact that the new universal end supports can accommodate the new system to most, if not all, skeletal frames and pallet rack tiers.

The new system features a placement continuum. The flow track can be adjusted continuously along the entire horizontal plane. More importantly, the new retaining elements allow for the track system to be extended to subsequent support frames, thereby providing sequential extension. No system had ever furnished this capability. Considering that the system is capable of sustained, heavy duty loading of 50 lbs./ft., the invention has produced a remarkable improvement over the prior art.

The objectives required of a good flow track system can be enumerated in order of importance, as follows:

1) The system must be inexpensive.
2) It should be of a low profile design, and work within the side profile clearances of the supporting beam structure, in order to provide maximum storage and cube use.
3) It should require minimal assembly.
4) The system should furnish the requisite structural support to carry heavy loads.
5) It should have a long operative life.
6) The system should have adjustability, so as to adapt to changing storage needs.
7) The system should be adaptable to the majority of warehouse and storage facilities.
8) The system should provide the capability to extend the tracks in the depth axis to subsequent storage frames, and to extend the tracks along the horizontal axis to fill the entire width of each storage tier.

The current invention not only provides all of the necessary aforementioned requirements of a good flow track system, but it also eliminates all of the previous drawbacks of its predecessor design. In this regard, it has advanced the state of the art by its universal adaptability to most warehouse facilities.

The improved flow track system of this invention can be drop-loaded upon the support beams of the frame assembly, thus providing convenience of assembly. The flow track member can be placed flush with the end supports in any position along the horizontal plane. The end of the flow track can also be positioned below the end supports, so that the end support can act as a limit stop for the stored materials. The improved flow track can provide heavy duty support and superior flow of materials over greatly extended distances along both the horizontal and depth axes.

The current invention features and facilitates at least four major functions:

1. It can be drop-loaded onto a storage tier.
2. It is infinitely expandable along the horizontal and depth axes of any tier of a storage facility.
3. It has a low profile and is substantially flush mounted to a support beam of a storage tier.
4. It has universality for adoption to almost any storage frame or storage system.

SUMMARY OF THE INVENTION

In accordance with the present invention, there is provided a universal flow rack system that can be fixtured to almost any supporting frame of a storage system without tools. The flow rack system of the invention features a flow track which has a roller conveying surface. The flow track comprises two elongated side rails that rotatably support a series of periodic, elongated, spaced-apart rollers therebetween. The flow track is fitted with stand members fixedly disposed across the elongated side rails at each distal end. The stand members are substantially parallel to the rollers and are designed to add bracing to the ends of the elongated, side rails. The stand members are also designed to function as supporting members, so that the flow track can be adjustably attached to the supporting frame of a pallet rack and provide a low profile.

The flow track is also movably attached to the storage frame by means of a hanger member. The hanger member comprises a hooked section on one end and a U-shaped support bracket section on the other end. The support bracket of the hanger member is designed to be placed below one of the stand members and to act as its support. Each respective stand member rests on the U-shaped support bracket section, so that the hanger member carries the distal end of the flow track.

The hooked section of the hanger member is designed to fit over a standard end support of a storage frame, thus attaching the flow track to the end support. This allows for quick assembly and removal of the flow track at any time. The flow track is infinitely positionable about the storage frame anywhere along the horizontal axis of the frame, by horizontally moving the hooked section of the hanger member across the span of the end support. The flow track can include an upper and lower stand member on each distal end.

The U-shaped bracket of the hanger member can fit under either the upper or lower stand member, thus allowing the flow track to attain a respective flush, or recessed, position with respect to the end support. The end support of the frame acts as a limit stop where the flow track is recessed below the end support. Materials flowing along the declined flow track abut against the end support, and are prevented from falling off the end of the storage frame.

The flow track of this invention is easily extendable to subsequent support frames by means of a mid-section, drop-in, retaining element that features a U-shaped channel that rests upon a mid-span support beam. The U-shaped channel has integral, right and left support bracket members that respectively support the back section of a subsequent flow track and the front section of a previous flow track.

The flow track system of this invention features three simple parts: (1) a flow track conveyor having a span of about eight to ten feet; (2) a hanger member that supports one end of the flow track, and that movably attaches to the end support of the pallet rack frame; and (3) a mid-span retaining element that drops in, and rests upon, a mid-span support beam.

For the purpose of definition, the term "end support" can refer to any end beam member of a tier of a storage frame, such as a pallet or form beam, and the term "mid-span support" can refer to any mid-section or mid-span beam or support member. Moreover, the term "low profile" refers to a flow track that provides a superior vertical storage density.

Each tier of the storage frame can be fitted with one or more of the flow tracks along the horizontal (X-axis) width thereof, as befits the need for support of the particular loads being conveyed, as well as a number of extension spans along the horizontal depth (Y-axis). In this fashion, the flow track system of this invention can be extended and custom-designed for all of the needs of almost any storage facility.

The heavy duty flow tracks of this invention are strong and provide a long operative life, despite their low cost. The drop-in loading of all parts, retaining and track elements offers unprecedented convenience. The flow tracks of this invention are the first heavy duty extendable flow tracks to the best of our knowledge.

It is an object of this invention to provide an improved flow track system.

It is another object of the invention to provide a flow track system that is universally adaptable to almost any support frame.

It is still another object of this invention to provide a flow track system that provides almost instantaneous assembly.

It is a further object of the invention to provide a flow track system of low cost.

It is yet a further object of this invention to provide a flow track conveying and storage system that is easily adjustable and that can be secured upon a storage frame or pallet rack without the need for tools.

It is still another object of the invention to provide a system that requires neither the purchase nor the installation of specific framework, towers or beams, a system that can be universally installed in almost any currently marketed pallet rack or wide-span rack structure.

It is yet a further object of this invention to provide a universal flow track system capable of extension in a depth dimension of the pallet rack tier.

BRIEF DESCRIPTION OF THE DRAWINGS

A complete understanding of the present invention may be obtained by reference to the accompanying drawings, when considered in conjunction with the subsequent detailed description, in which:

FIGS. 9aa through 9cc show further enlarged, detail side views of the retaining hanger elements illustrated in FIGS. 9a through 9c.

For the sake of brevity and clarity, like elements and components throughout the following detailed description shall bear identical designations in the FIGURES.

DESCRIPTION OF THE PREFERRED EMBODIMENT

Generally speaking, the invention features a flow track comprising a plurality of periodically-spaced rollers, upon which materials can be conveyed from one position to another on the span. The rollers are rotatively supported between two rails or channels defining the flow track. The flow track is positionable between two end support beams of a storage frame or pallet rack, with each end support beam supporting a distal end of the flow track. The flow track is adjustably positionable along the entire horizontal length of the respective end support beams. A movable hanger member supports the flow track for adjustment about the end support beams, and is movable in a horizontal direction (along the X-axis or the longitudinal length of the support beams) with respect to the storage frame or pallet rack. An extended flow track system is achieved in the depth or material flow direction (Y-axis) by use of an alternate hanger member at mid-span. A front slide member is attachable to the front support member using the alternate hanger member.

Figure 1:
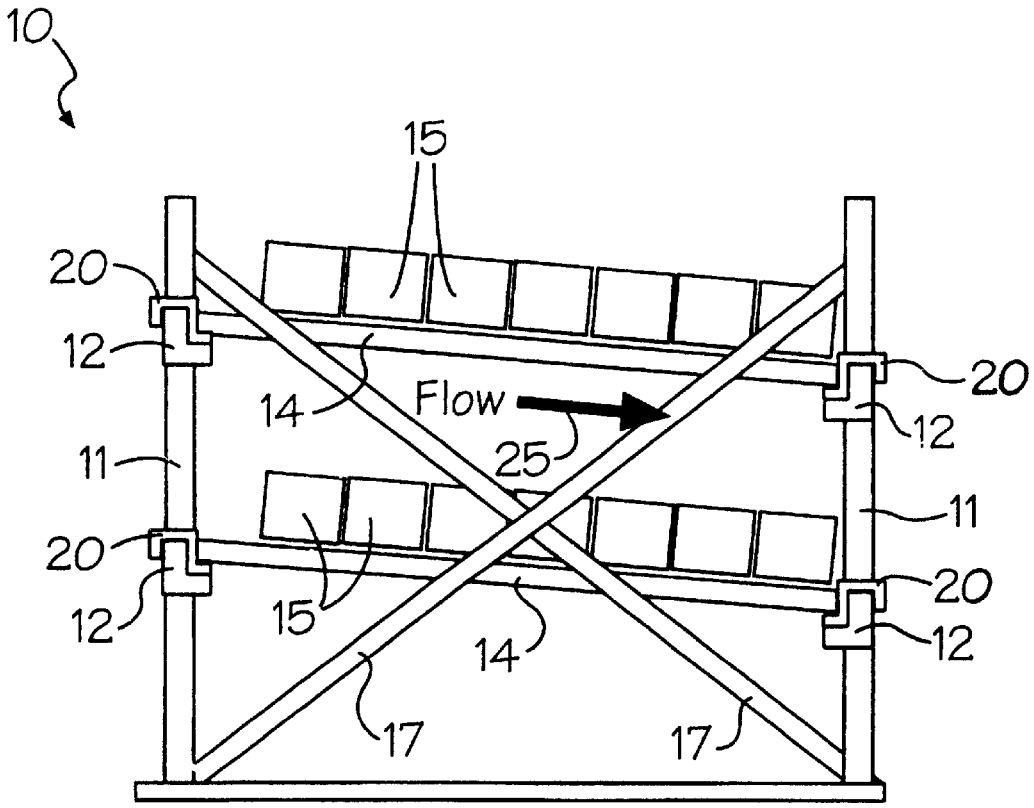
FIG. 1 illustrates a side view of a typical tier-type storage frame commonly found in warehouses and other material storage facilities with the flow track of this invention disposed across its span.
Figure 2:
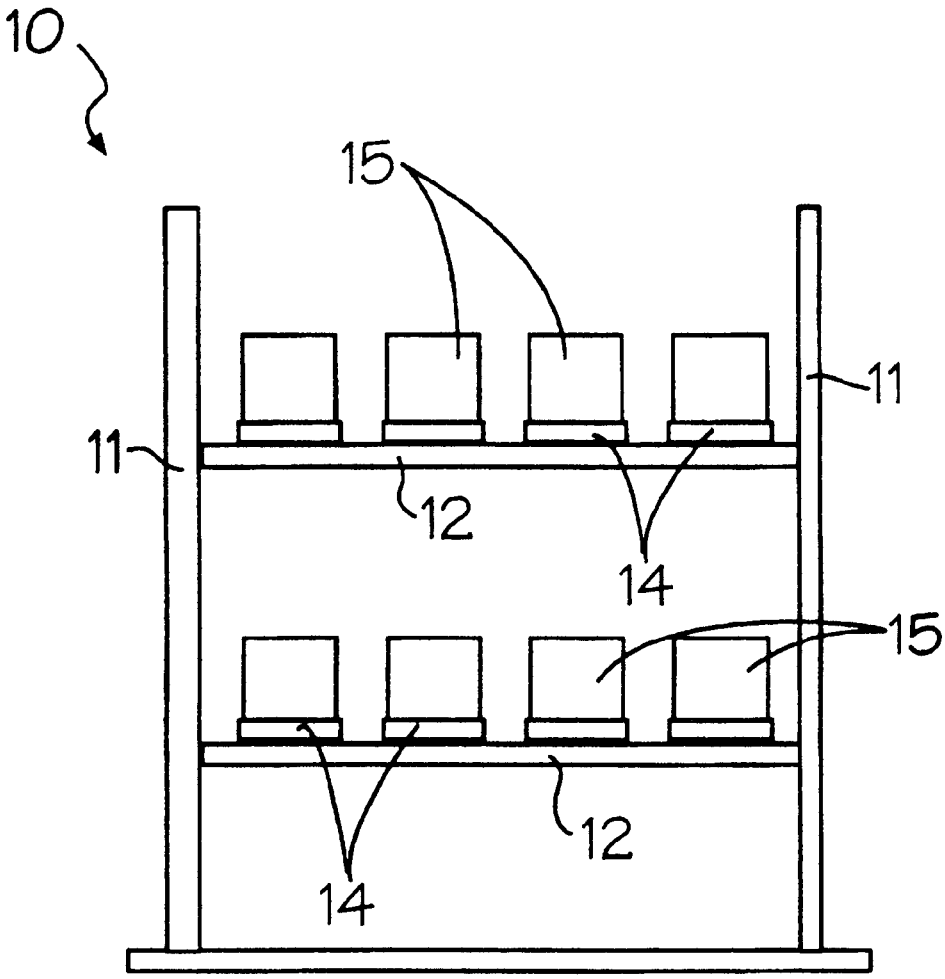
FIG. 2 depicts a front view of the storage frame illustrated in FIG. 1.

Now referring to FIGS. 1 and 2, a typical tier-type storage frame 10 found in warehouses and other material storage facilities is shown in respective side and front views. This type of storage frame can accommodate the flow track system of the present invention. The frame 10 comprises vertical support members 11 and horizontal end support beams 12, also known as form bars. The flow tracks 14 of the invention are shown in situ, as they span across the storage frame 10 between the end support beams 12. The end support beams 12 can support a number of flow tracks 14 on each tier, as illustrated in FIG. 2. Boxes 15 and other materials are carried by the flow tracks 14 in each tier, as illustrated. Diagonal braces 17 can be used, structurally, to enhance the rigidity of the storage frame 10, as shown in FIG. 1. The flow tracks 14 are secured to the end support beams 12 by means of hangers 20, as is explained hereinafter.

Figure 3:
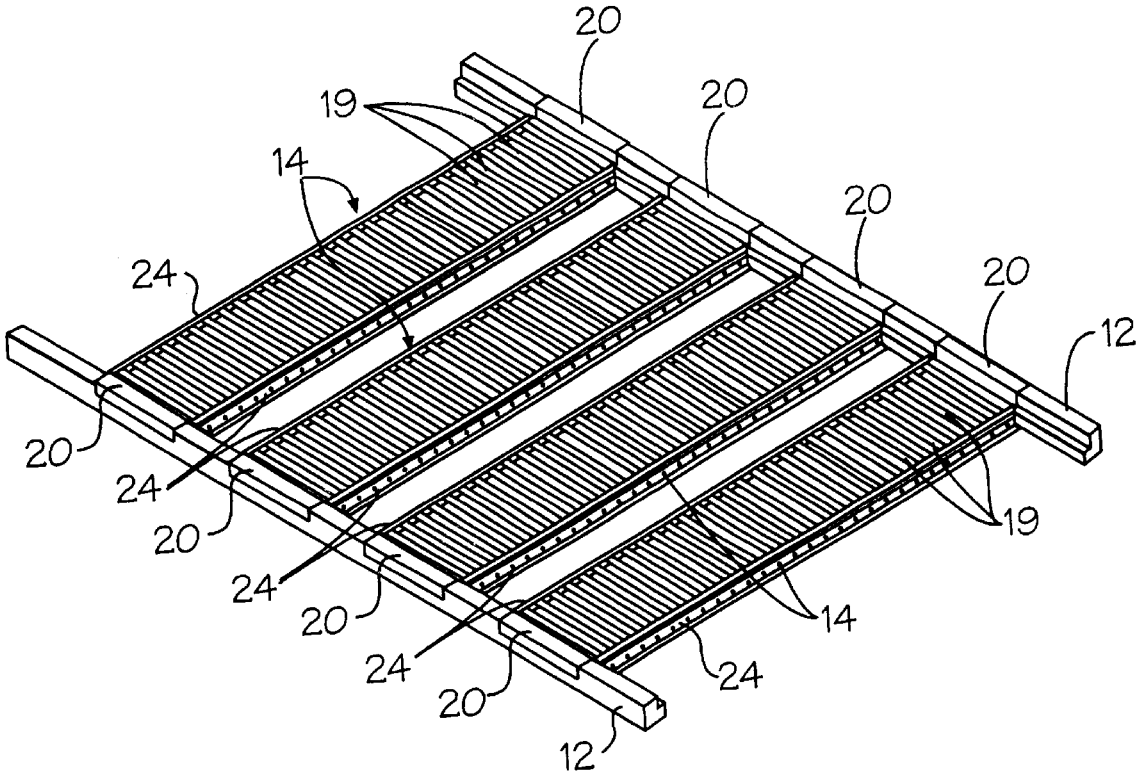
FIG. 3 shows a perspective, in situ view of the flow track system of this invention, with a plurality of flow tracks each with distal end hanger members that mount the flow tracks upon the end supports of the typical storage frame illustrated in FIGS. 1 and 2.
Figure 4:
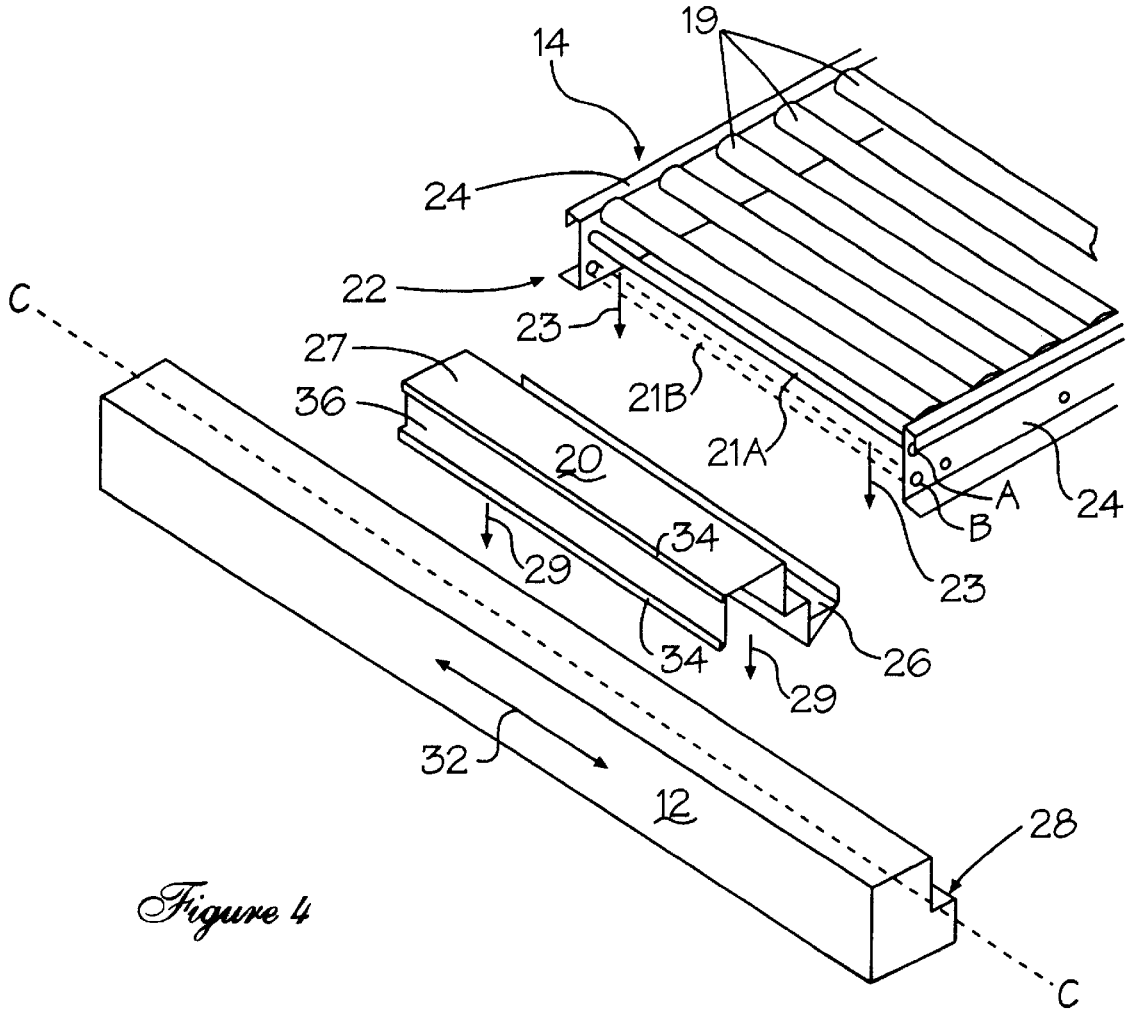
FIG. 4 illustrates an enlarged, assembly view of one end of a typical flow track shown in FIG. 3.

Referring to FIG. 3, a perspective view of a plurality of flow tracks 14 of this invention is shown disposed on the end support beams 12 of the storage frame. The flow track 14 is supported on the support end bars 12 by means of hangers 20, which are shown in greater detail in FIG. 4. Each flow track 14 comprises a series of spaced-apart, periodically disposed rollers 19, upon which the boxes 15 are caused to flow (see arrow 25, FIG. 1). The rollers 19 are rotatably fixed upon the flow track 14 and are supported by spaced-apart side rails 24. Each flow track 14 comprises at least one stand member 21A and/or 21B (FIG. 4) that is mechanically fastened between the side rails 24 at each distal end 22. The stand member 21A, 21B can comprise a metal shaft, or rod, that lends added bracing for the side rails 24. The main purpose of the stand member 21, however, is to act as an intermediate support member between the flow track 14 and the hanger 20. The stand member 21 nests within the U-shaped well 26 of the hanger 20, and is supported thereby, as illustrated by arrows 23. The distal end 22 of the flow track 14 can accommodate an upper stand member 21A, shown in solid line at position A, and/or a lower stand member 21B, shown in phantom at position B. Either upper or lower stand member 21 can be placed within the U-shaped well 26 of the hanger 20. The purpose of having lower and/or upper stand members 21 at each end 22 of the flow track 14 is explained in more detail hereinafter, with reference to FIGS. 5 and 6.

The hanger 20 has a hook section 27 that is shaped to conform to the stepwise configuration 28 of the end support beam 12. The hook section 27 is placed over the stepwise configuration 28 of the end support beam 12, as shown by arrows 29. In this position, the hanger 20 affixes the flow track 14 to the end support beam 12, via stand member 21, which is affixed between the side rails 24, and supported in well 26 of the hanger 20. The hook section 27 of hanger 20 can be placed anywhere along the horizontal axis C-C of the end support beam 12, as shown by arrows 32. In this manner, the positional adjustment of the flow track 14 with respect to the end support beam 12 is infinite.

Figure 5:
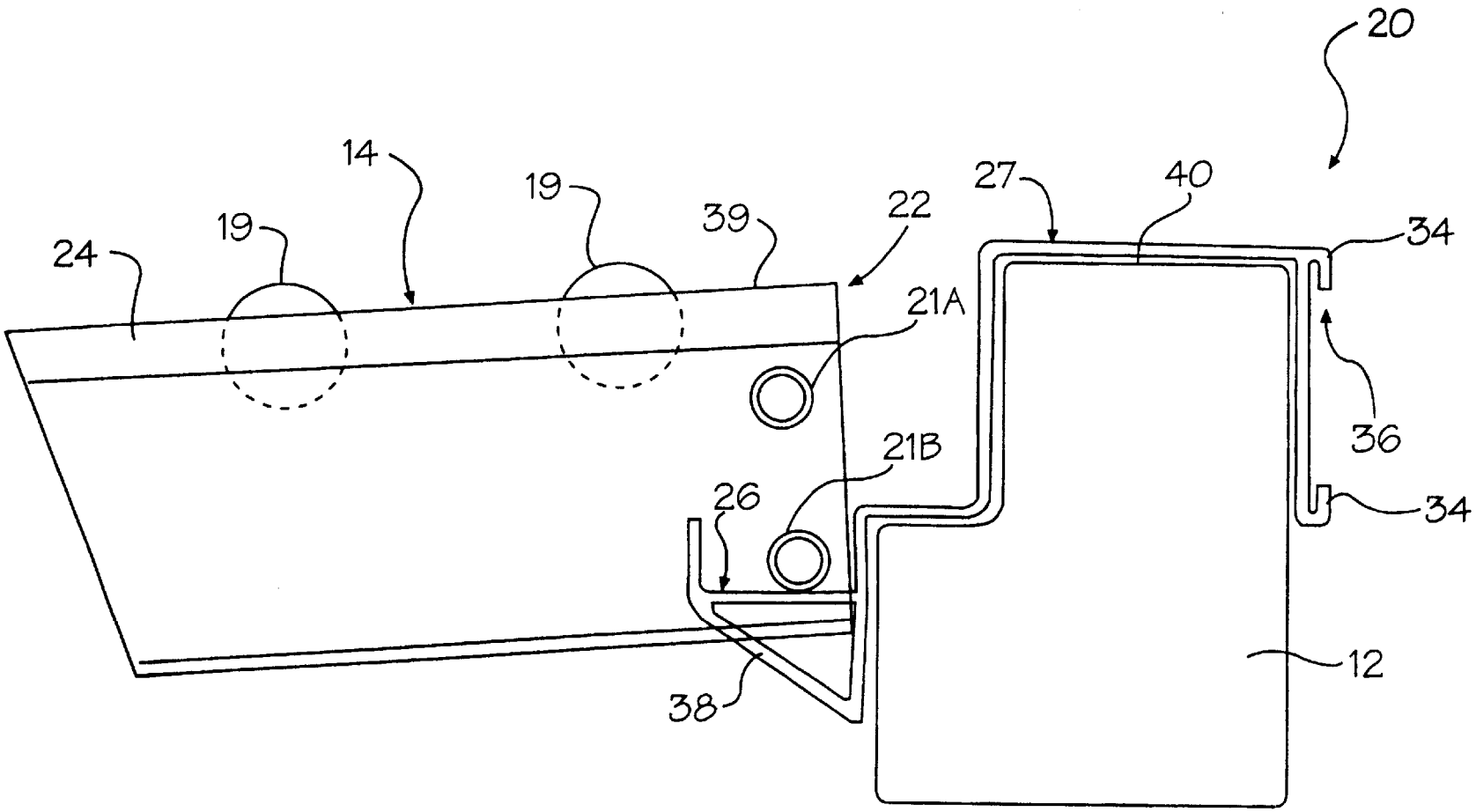
FIG. 5 depicts an enlarged, sectional view of the flow track and hanger member combination of the flow track system of this invention, as shown in FIGS. 3 and 4, with the U-shaped support section of the hanger member carrying a lower support shaft of the flow track.

Referring to FIG. 5, the front end 22 of the flow track 14 is shown in enlarged detail. It will be observed that the lower stand member 21B of flow track 14 rests within well 26 of hanger 20. In this position, the stand member 21B rests in well 26, which causes the top 39 of the flow track 14 to be flush with the top 40 of the end support beam 12. Packages or boxes 15 (FIG. 1) easily slide over the top 40 of the end support beam 12, contact the top 39 of the flow track 14, and flow toward the rear of the flow track, as shown by arrow 25 (FIG. 1).

Figure 6:
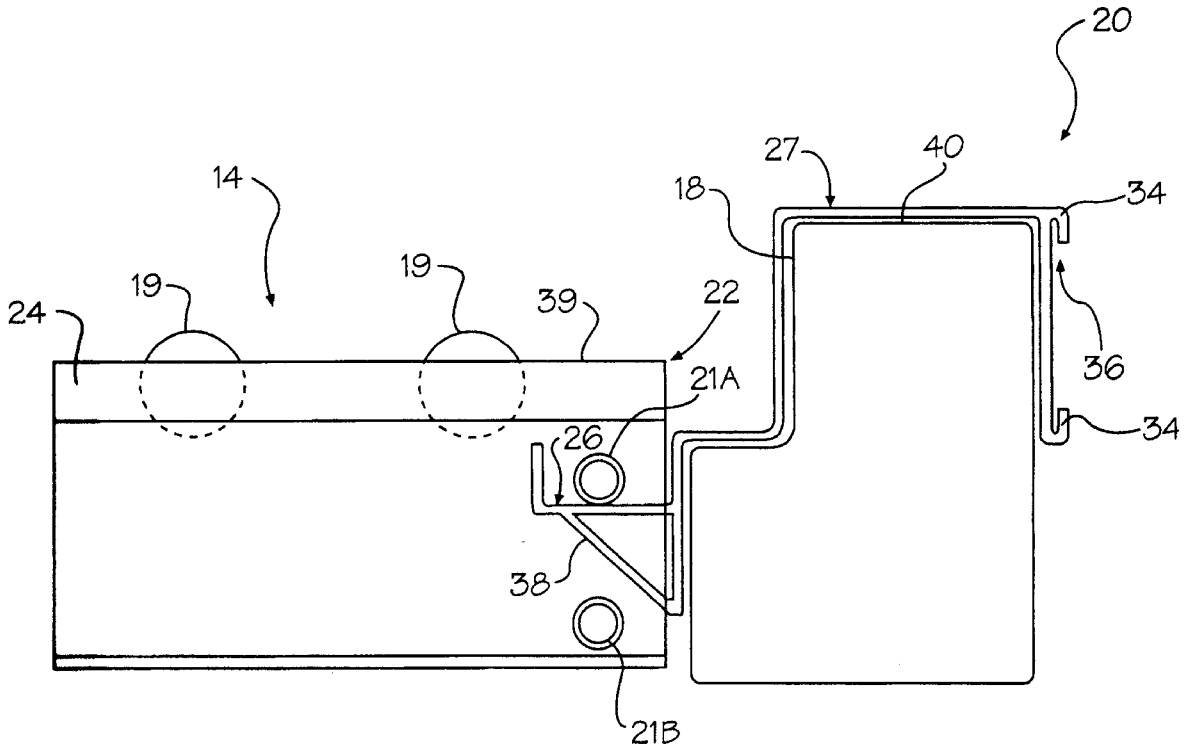
FIG. 6 shows an enlarged, sectional view of the flow track and hanger member combination of the flow track system of this invention, as illustrated in FIGS. 3 and 4, with the U-shaped support section of the hanger member carrying an upper support shaft of the flow track.

Referring to FIG. 6, the rear end 22 of the flow track 14 is shown in enlarged detail. It will be observed that the upper stand member 21A of flow track 14 rests within well 26 of hanger 20. In this position, the stand member 21A rests in well 26, which causes the top 39 of the flow track 14 to be under-hung from the top 40 of the end support beam 12. Packages or boxes 15 (FIG. 1) entering the flow track 14 (FIG. 5) easily slide over the flow track 14, and are stopped by the side 18 of the end support beam 12, which acts as a stop for the moving package or box 15 (FIG. 1) flowing toward the rear end 22.

The well 26 of the hanger 20 is provided with a triangular reinforcement member 38 in order to stiffen the hanger 20 for accommodating heavy loads.

The hook section 27 is also provided with two tabs 34 that form a slot 36. The slot 36 can be filled with a name plate or name card to mark the materials or contents of the boxes 15 being held upon the flow track support.

Figure 7:
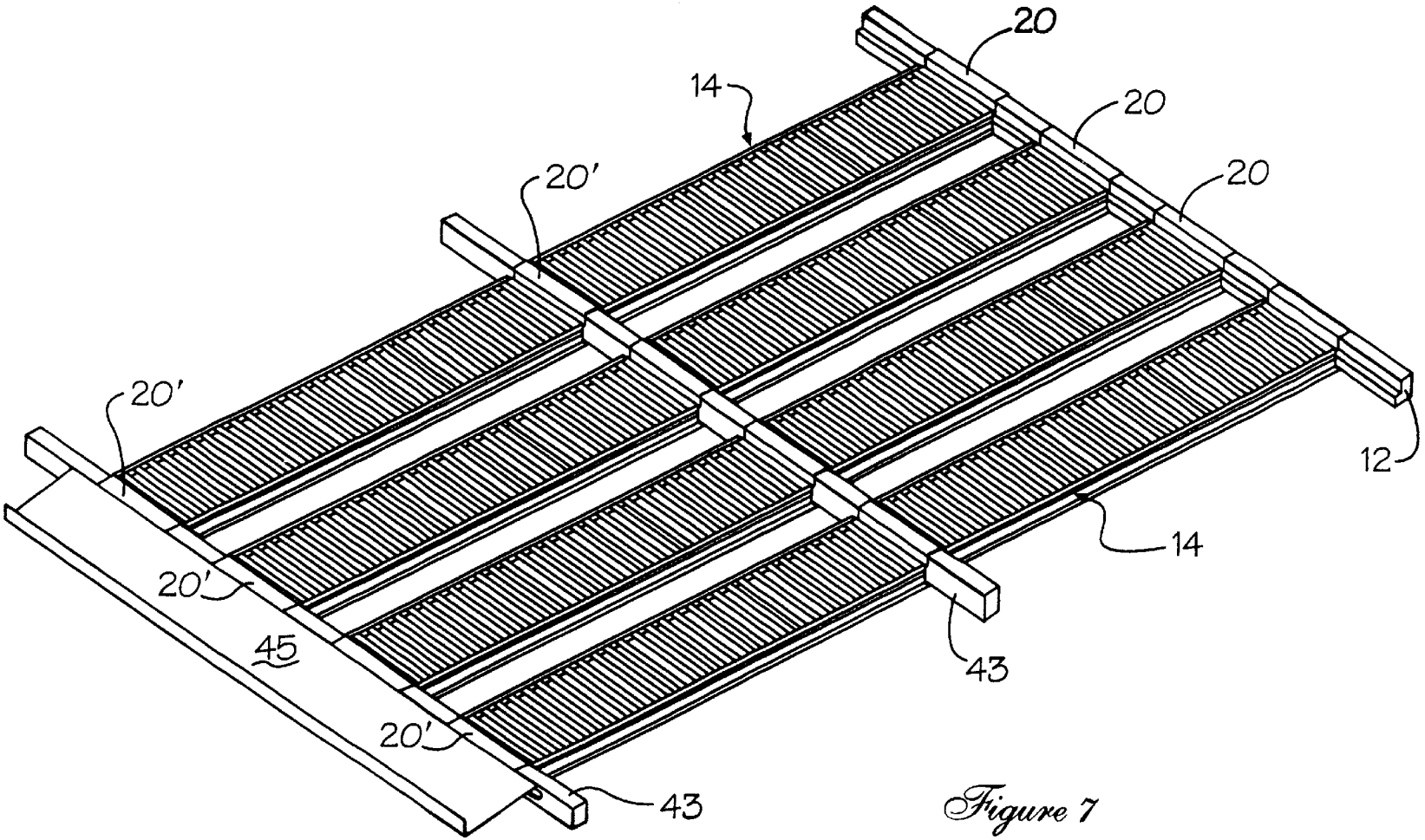
FIG. 7 illustrates a perspective view of an extended flow track system wherein a mid-span beam and hanger element supports two back-to-back flow tracks, and a front slide extension member attached to a front support beam.
Figure 8:
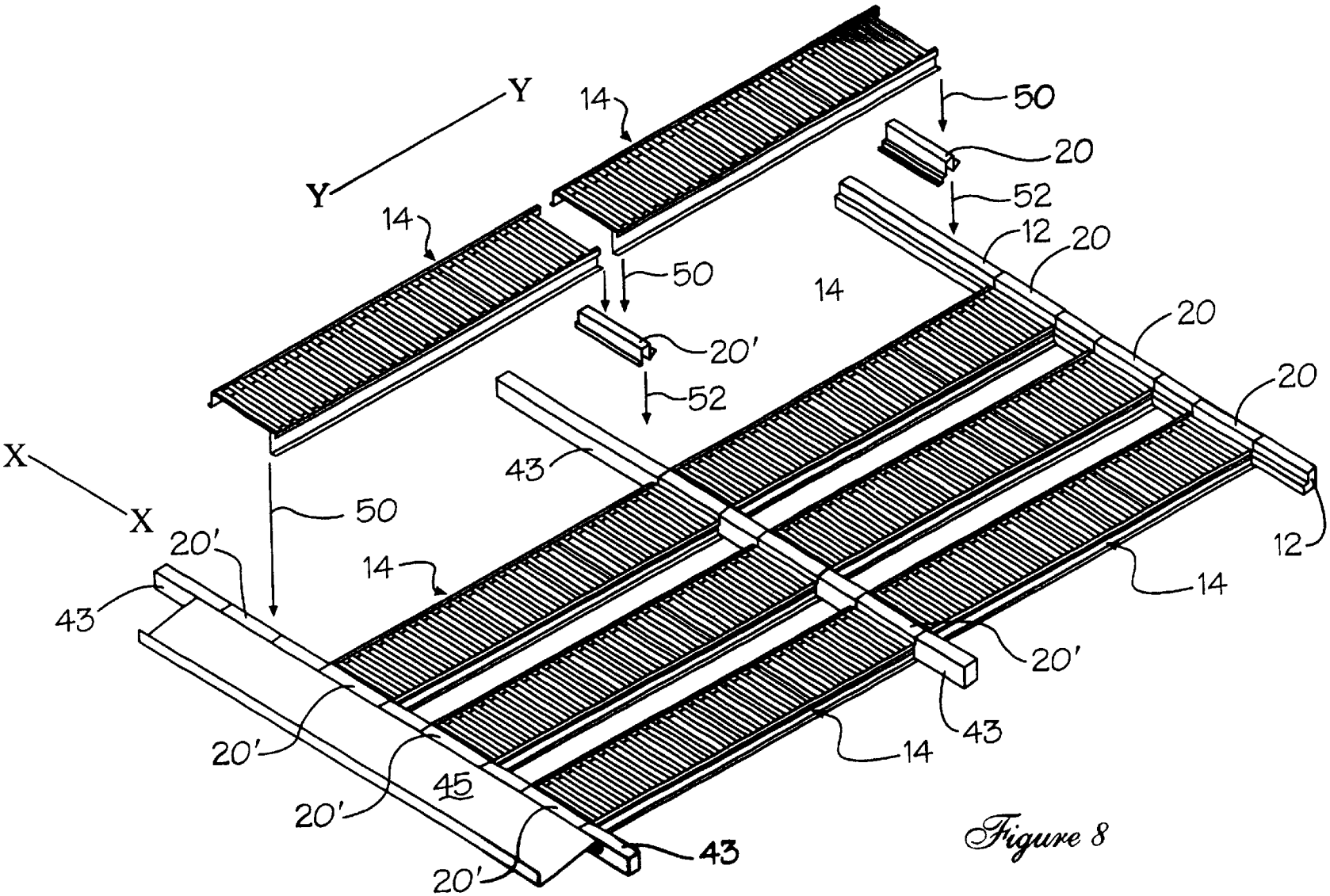
FIG. 8 depicts a perspective, exploded view of the extended flow track system, shown in FIG. 7.
Figures 9, 9A, 9B, 9C:
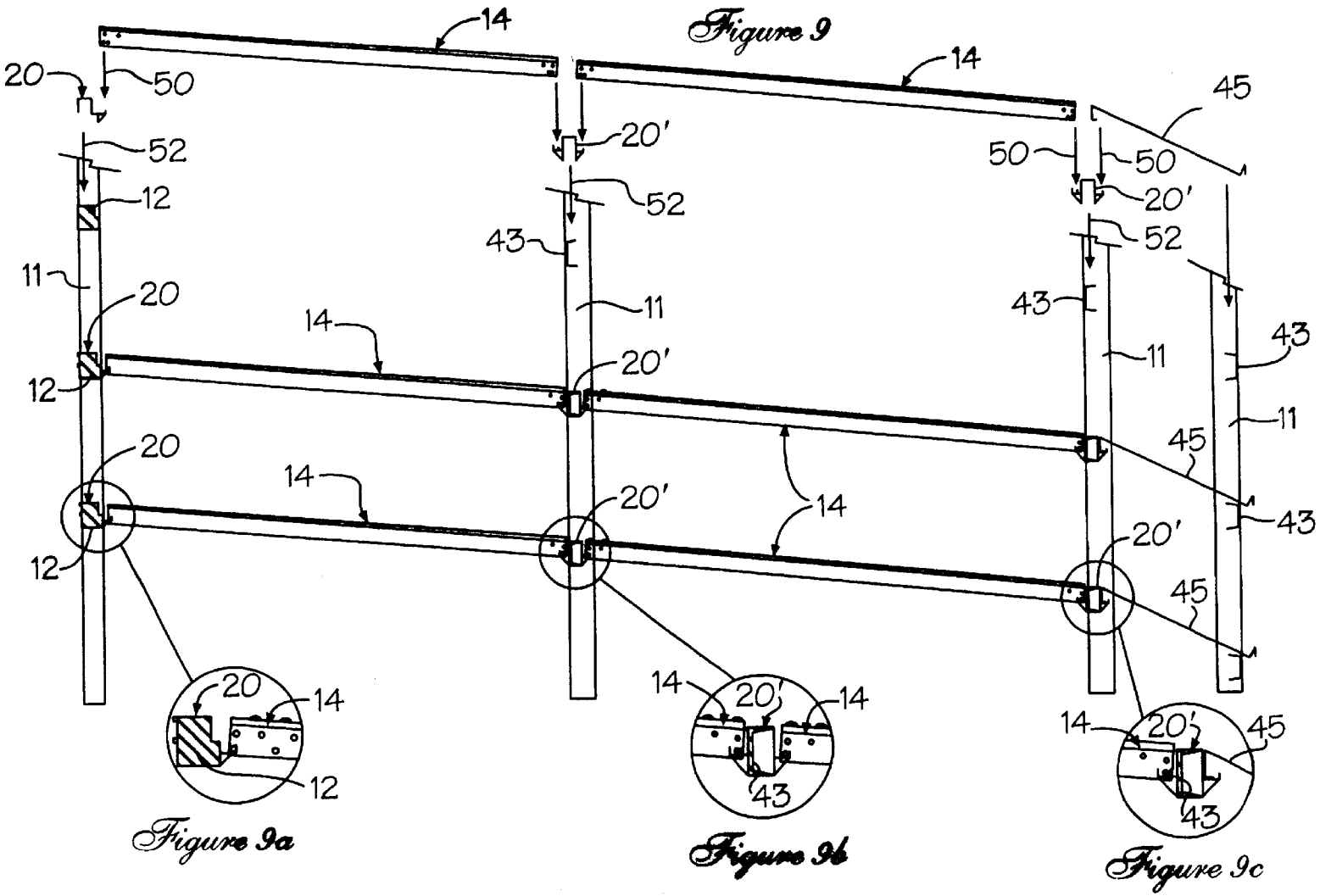
FIG. 9 shows a side, exploded view of the extended flow track system, depicted in FIG. 8.
FIGS. 9a through 9c illustrate enlarged side views of the retaining hanger elements used to attach the flow tracks and the front slide extension to the support beams for the extended flow track system depicted in FIGS. 7, 8, and 9.
Figure 9A:
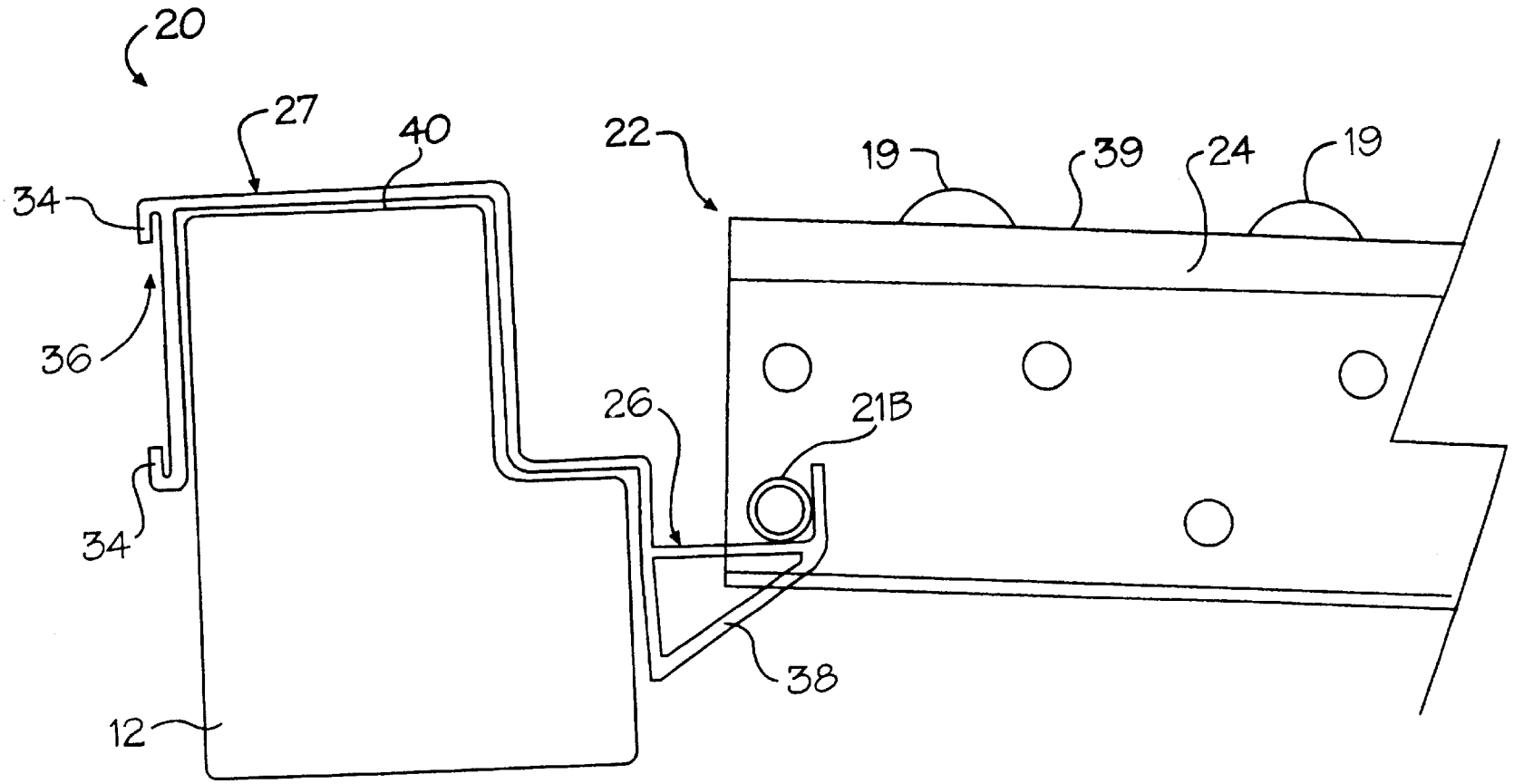
Figure 9B:
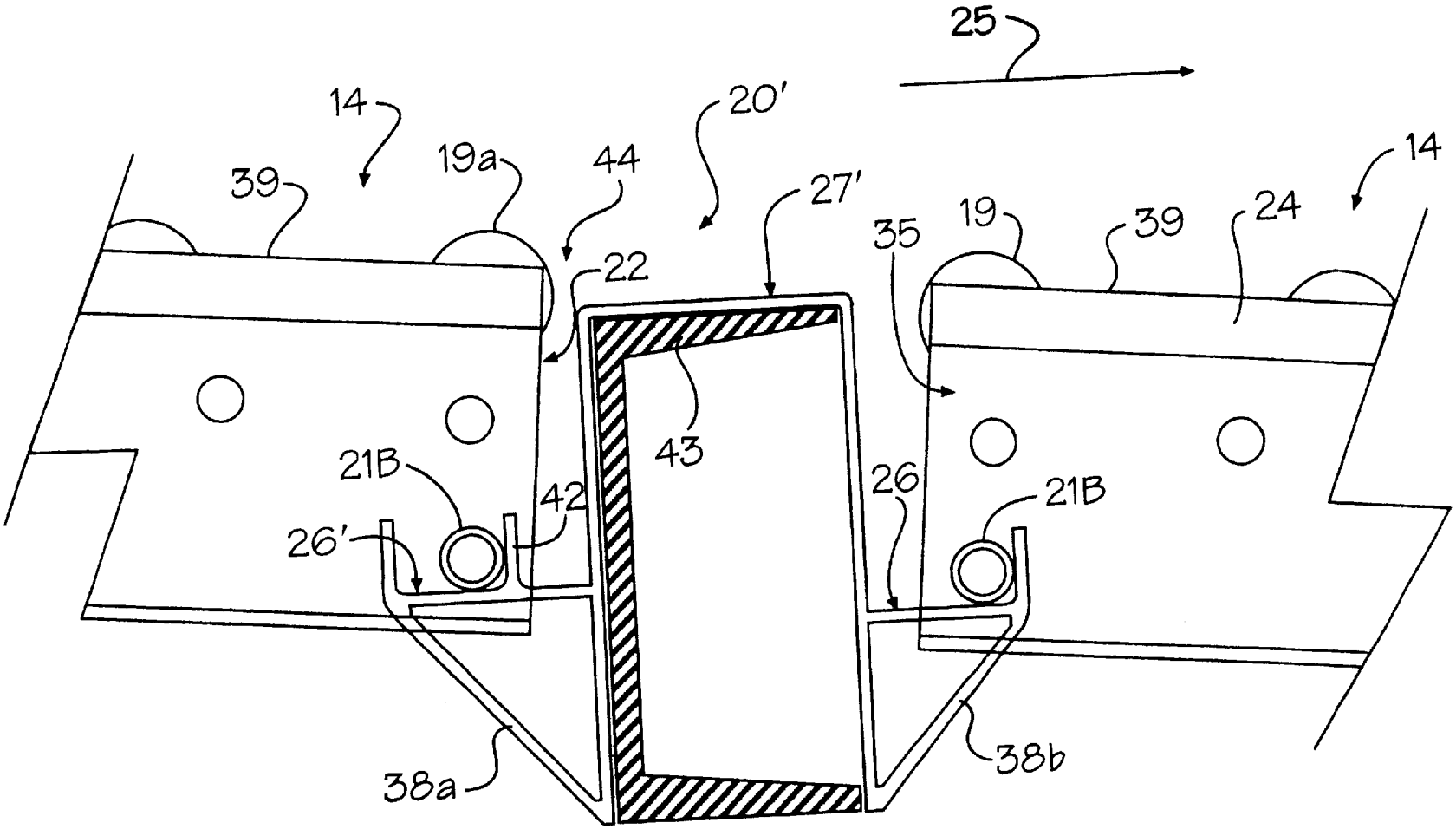
Figure 9C:
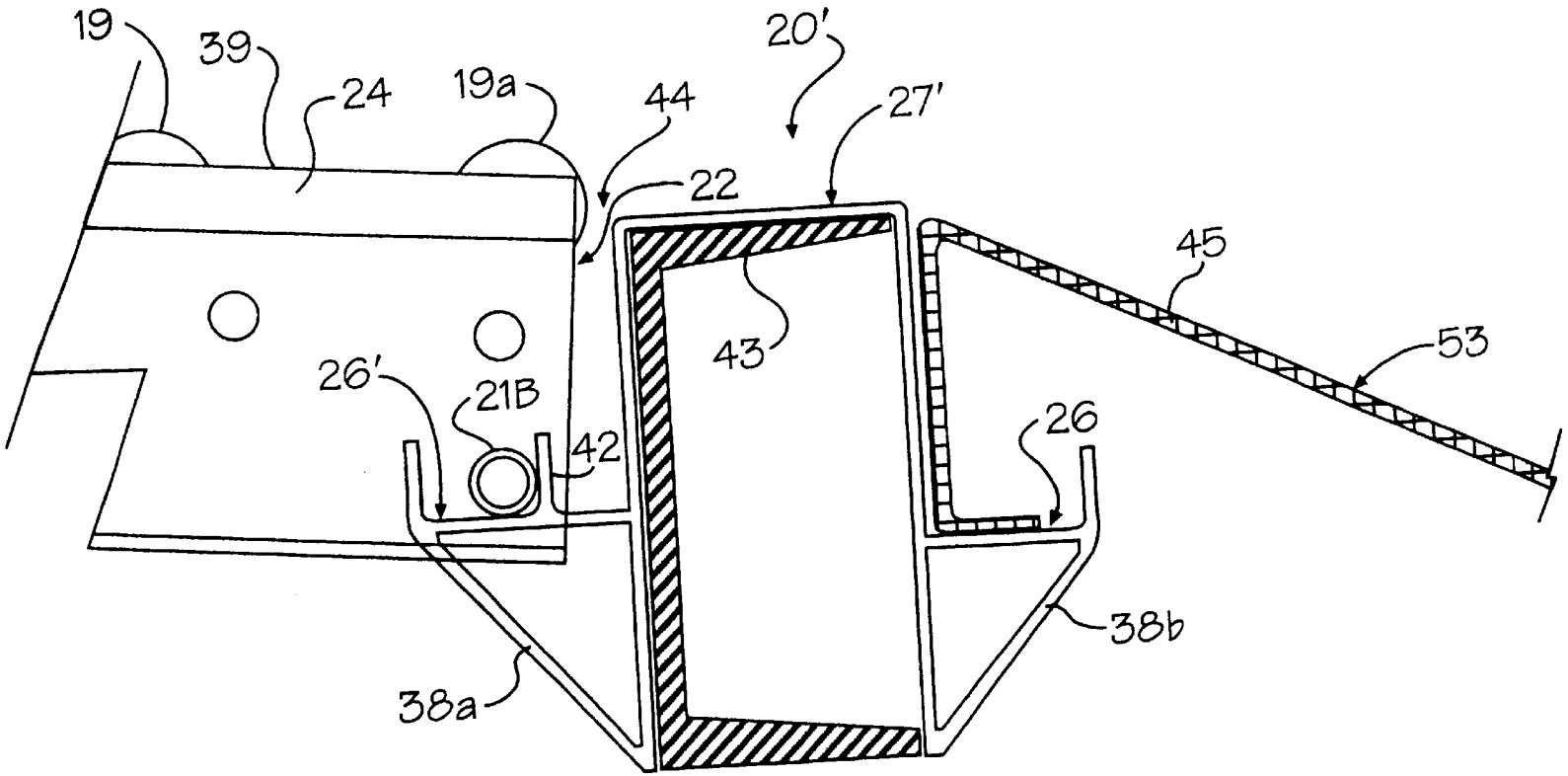

Referring to FIGS. 7, 8, and 9, an extended flow track system of this invention is shown. An extended system is defined by a plurality of flow tracks 14 that is arranged in tandem, or back-to-back along the depth (Y-axis) of the pallet rack tier (FIG. 8). Any number of flow tracks 14 can be strung along the Y-axis, as befits the warehouse design. The extended flow track system comprises the usual flow track elements 14 that are drop-loaded (arrows 50) onto appropriate retaining elements 20 and 20', which are also drop-loaded (arrows 52) onto their respective frame support beams 12, 43, and 43. A front slide member 45 can be attached to a front loaded retaining element 20', as is explained in detail hereinafter with reference to FIGS. 9c and 9cc.

Naturally, the number of flow tracks 14 that can be accommodated along the longitudinal length of the horizontal support beams 12, 43, and 43 is dependent upon the span of the vertical frame support columns 11. In order to provide an extended system in the depth (Y-axis) direction, it is necessary to provide horizontal beam supports 43 mid-span, and in front of the frame support, as shown. It is also necessary to provide an alternate embodiment of the retainer 20, now shown as channel 20'. Channel 20' is provided with a U-shaped hook section 27', as illustrated in FIGS. 9b, 9bb, 9c, and 9cc, respectively. The U-shaped hook section 27' is designed to fit over the horizontal support beams 43. The back of the extended flow track system (FIGS. 9a and 9aa) is supported by the retainer 20 and form beam 12, as previously described with respect to FIG. 5.

Referring to FIGS. 9b and 9bb, the mid-span support arrangement is shown in greater detail. The mid-span comprises the retainer element 20' whose hook section 27' is drop-loaded upon mid-span support beam 42, as aforementioned. The hook section 27' comprises a left bracket 38a and a right bracket 38b. The front end 22 of the tandemly placed flow track 14 is shown in enlarged detail. It will be observed that the lower stand member 21B of the rear flow track 14 rests within well 26' of the bracket 38a of hanger 20'. In this position, the stand member 21B rests in well 26', which causes the top 39 of the flow track 14 to be positioned slightly above the top of the mid-span hook section 27'. Packages or boxes 15 (FIG. 1) easily slide over the top of the end support beam 43 and flow toward the rear 35 of the front flow track 14, as shown by material flow arrow 25. (Also see FIG. 1.)

A stop abutment 42, projecting upwardly from the bottom of well 26', ensures that the stand member 21B is spaced a given gap distance 44 from the mid-span support beam 43. This gap distance 44 assures that the front roller 19a will not abut against the hook section 27', which would hinder its ability to turn. The stand member 21B of the rear 35 of the front flow track 14 rests in well 26 of the bracket 38b.

Referring to FIGS. 9c and 9cc, it will be observed that the alternate retainer element 20' is used for supporting the front end 22 of the front flow track 14. As before, the stand member 21B of the front flow track 14 rests in well 26' of the bracket 38b, and abutment 42 provides a gap 44 to ensure that the front roller 19a will not abut against the hook section 27', and hence will remain free rolling. The front bracket 38b allows for the placement of a front slide member 45, which rests on the well surface 26. The front slide member 45 has a slide surface 53 that is disposed at a greater angle of decline than that of the flow tracks, in order to facilitate removal of the front container that has slid forward (arrow 25) upon the flow track system of this invention.

It should be understood that the flow track system of this invention is depth direction (Y-axis) expandable for as many conveying flow tracks 14 as is feasible within the design parameters of the warehouse engineer.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

[1. A low profile, horizontal and depth extendable flow track system that is universally accommodated to a variety of storage frames and pallet racks, comprising:

a flow track conveyor member having elongated side rails, a series of conveying elements disposed between and spaced along said elongated side rails, said elongated side rails having spaced-apart hanger members for supporting a respective stand member on distal ends thereof, each of said stand members being receivable by support sections of a respective hanger member; and wherein said spaced-apart hanger members each has a hook section, each stand member support section receiving a respective stand member of said flow track that is disposed on a respective distal end thereof, said spaced-apart hanger members respectively supporting said flow track therebetween by virtue of said hook sections which fit over, and hook to, respective end support beams distally disposed on a storage frame, thus providing depth extendibility, and whereby said flow track via said spaced-apart hanger members is supported across an elongated span between said end support beams of said storage frame, and is supported anywhere along a horizontal length of said end support beams in order to be horizontally extendable along said end support beams.]

[2. The flow track system in accordance with claim 1, wherein said series of conveyor elements of said flow-track conveyor member further comprises a plurality of rollers substantially evenly spaced along said elongated side rails and rotatively supported thereby.]

[3. The flow track system in accordance with claim 1, wherein said member support section comprises a substantially U-shaped channel.]

[4. The flow track system in accordance with claim 1, wherein said member support section is structurally supported by a substantially triangular support member.]

[5. The flow track system in accordance with claim 1, wherein a hanger member comprises means defining a slot for insertion of a name plate or name card.]

[6. The low profile, horizontal and depth extendable flow track system in accordance with claim 1, wherein two stand members are disposed on each distal end of said flow track, each stand member being disposed at a different level upon said flow track, whereby an angle of said flow track with respect to an end beam can be changed.]

[7. A universal, low profile, expandable, flow track system having at least one conveying member disposed on at least one tier carried by storage support beams, said conveying member being freely and infinitely movable along horizontal an axis of said storage support beams of said tier in order to assume any horizontal position thereupon, but substantially, rigidly positioned between said storage support beams, said conveying member comprising a plurality of spaced-apart rigid support rails that define a span between said storage support beams, a series of rollers substantially periodically disposed along said span defined by said spaced-apart rigid support rails, and each of said series of rollers being rotatably affixed between said spaced-apart rigid support rails across a width thereof, said conveying member having at least one stand member disposed at distal ends thereof, said stand member providing bracing to said spaced-apart rigid support rails, and having an additional function to provide substantially flush, low profile support and drop-loading attachment to said storage support beams anywhere along a horizontal axis of said storage support beams, said conveying member being easily and freely movable along said storage support beams on either distal end thereof, whereby said conveying member can be freely adjusted upon said tier, and further wherein said conveying member can be expanded along a depth axis by addition of tandemly placed conveying members.]

[8. The universal, low profile, expandable flow track system of claim 7, further comprising a pair of spaced-apart hanger members each having a stand member support section and a hook section, said stand member support section receiving a respective stand member of said flow track that is disposed on a respective distal end thereof, and spaced-apart hanger members respectively supporting said flow track therebetween by virtue of said hook sections which fit over, and hook to, respective end support beams.]

[9. The universal, low profile expandable flow track system of claim 7, wherein each hanger member further comprises means defining a slot for insertion of a name plate or name card.]

[10. The low profile, horizontal and depth extendable flow track system in accordance with claim 7, wherein two stand members are disposed on each distal end of said conveying member, each stand member being disposed at a different level upon said conveying member, whereby an angle of said conveying member with respect to said rigid support beam can be changed.]

[11. A universal, low profile, expandable flow track system for mounting upon a storage support having end beams, comprising at least one elongated conveying member having distal ends carried by said storage support, said conveying member providing flow track function to said storage support, adjustable mounting means for adjustably mounting said elongated conveying member anywhere about a horizontal axis of said storage support including an under-hang position about one end beam of said storage support, said adjustable mounting means including a pair of hanger members that respectively slide over respective end beams of said storage support, and which carry said conveying member therebetween, said conveying member having stand members that rest upon a respective one of said pair of hanger members to provide a substantially flush, low profile with respect to said end beam in one stand member position, and a conveying member angle with respect to said end beam being adjustable to an under-hang position below said end beam in a second stand member position.]

[12. The universal, low profile, expandable flow track system in accordance with claim 11, wherein two stand members are disposed o n each distal end of said conveying member, including an upper and a lower stand member, one of said two stand members on each distal end of said conveying member resting upon one of said pair of hanger members, said conveying member exhibiting said under-hang position when said upper stand member rests upon a respective one of said pair of hanger members.]

[13. The universal, low profile, expandable flow track system in accordance with claim 11, wherein said hanger members are each braced by a triangular support section in order to support heavy loadings upon said conveying member.]

[14. The universal, low profile, expandable flow track system in accordance with claim 11, wherein said hanger members each comprise means defining a slot for insertion of a name card or name plate.]

[15. The universal, low profile, expandable flow track system in accordance with claim 11, wherein said hanger members each comprise a hook section and a support section, said hook section being disposed upon said end beam and said support section carrying one end of said conveying means.]

16. A universal, low profile, expandable flow track system for mounting upon a storage support having end beams and at least one mid-span beam, comprising at least two elongated conveying members extending along a depth direction, each having distal ends carried by said storage support, said conveying member providing flow track function to said storage support, adjustable mounting means for adjustably mounting said elongated conveying member anywhere about a horizontal axis of said storage support including an under-hang position about one end beam of said storage support, and a center support member being disposed upon said at least one mid-span beam, for attaching said at least two elongated conveying members by drop loading said at least two elongated conveying members into said center support member, thereby expanding said flow track system along said depth direction.

17. A universal, low profile, expandable flow track system for mounting upon a storage support having end beams and at least one mid-span beam, said universal, low profile, expandable flow track system comprising at least a pair of tandemly placed flow tracks for conveying articles thereupon, a mid-span support for attaching said flow tracks to said mid-span beam to form tandem placement thereof, and adjustably mounting end beam hangers for mounting a distal end of each flow track anywhere along a respective end beam, said expandable flow track system being characterized by its capability to be expandable in both horizontal and depth directions about said storage support.

* * * * *